United States Patent
Wietfeldt et al.

(10) Patent No.: US 9,632,184 B2
(45) Date of Patent: Apr. 25, 2017

(54) SYSTEMS AND METHODS FOR MANAGING THE COEXISTENCE OF A GNSS RECEIVER AND A RAT TRANSCEIVER

(71) Applicant: QUALCOMM Incorporated, San Diego, CA (US)

(72) Inventors: Richard Dominic Wietfeldt, San Diego, CA (US); George Chrisikos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 14/268,823

(22) Filed: May 2, 2014

(65) Prior Publication Data
US 2015/0316652 A1  Nov. 5, 2015

(51) Int. Cl.
| | |
|---|---|
| G01S 19/21 | (2010.01) |
| G01S 19/13 | (2010.01) |
| G01S 19/28 | (2010.01) |
| G01S 19/25 | (2010.01) |
| H04B 1/52 | (2015.01) |
| H04B 1/525 | (2015.01) |

(52) U.S. Cl.
CPC ............ G01S 19/21 (2013.01); G01S 19/13 (2013.01); G01S 19/258 (2013.01); G01S 19/28 (2013.01); H04B 1/525 (2013.01)

(58) Field of Classification Search
CPC .......... G01S 19/21; G01S 19/13; G01S 19/28; G01S 19/258; G01S 5/0215; H04B 1/525
See application file for complete search history.

(56) References Cited

U.S. PATENT DOCUMENTS

| | | | |
|---|---|---|---|
| 5,661,491 A | 8/1997 | Jones | |
| 7,598,908 B2 | 10/2009 | Chao et al. | |
| 7,859,453 B2 * | 12/2010 | Rowitch | ................. G01S 19/21 |
| | | | 342/357.21 |
| 8,064,824 B2 | 11/2011 | Karabinis | |
| 8,290,000 B2 | 10/2012 | Marko | |
| 8,456,358 B2 | 6/2013 | Xhafa et al. | |
| 2004/0247058 A1 | 12/2004 | Abraham | |
| 2009/0131095 A1 | 5/2009 | Rofougaran | |

(Continued)

OTHER PUBLICATIONS

International Search Report and Written Opinion—PCT/US2015/027412—ISA/EPO—Aug. 6, 2015.

*Primary Examiner* — Cassie Galt
(74) *Attorney, Agent, or Firm* — Kilpatrick Townsend & Stockton, LLP

(57) ABSTRACT

Various arrangements are presented for managing coexistence of a global navigation satellite system (GNSS) receiver with a radio access technology (RAT) transceiver. A coexistence manager may receive an indication of a characteristic of a RAT transceiver for a scheduled operating event. Based on the characteristic of the RAT transceiver for the operating event, the coexistence manager may select a space vehicle of a GNSS to use for a location determination by the GNSS receiver. The GNSS receiver may then receive a signal from the space vehicle of the GNSS during the operating event of the RAT transceiver. Location determination using the signal received from the space vehicle received during the operating event of the RAT transceiver may then occur.

26 Claims, 7 Drawing Sheets

(56) References Cited

U.S. PATENT DOCUMENTS

2010/0304770 A1* 12/2010 Wietfeldt .......... H04W 72/1215
  455/509
2013/0142157 A1   6/2013 Pesola
2014/0050146 A1   2/2014 Chrisikos et al.
2014/0368379 A1* 12/2014 Lennen ................ G01S 19/33
  342/357.25

* cited by examiner

SYSTEMS AND METHODS FOR MANAGING THE COEXISTENCE OF A GNSS RECEIVER AND A RAT TRANSCEIVER

BACKGROUND

Conventionally, when a radio access technology (RAT) transceiver is transmitting data wirelessly via an antenna, a global navigation satellite system (GNSS) receiver located on the same device may not be able to process received GNSS signals for performing a location determination. When transmitting, a RAT transceiver may, in some situations, produce a sufficient amount of noise that negatively affects the ability of the GNSS receiver to properly receive and process GNSS signals. The GNSS receiver may be instructed to blank or otherwise ignore GNSS signals received while the RAT transceiver is transmitting. Such arrangements may result in significant periods of time during which a location determination cannot be performed by the GNSS receiver. Such an occurrence may be exacerbated if multiple RAT transceivers are present on the device.

SUMMARY

In some embodiments, a method for managing coexistence of a global navigation satellite system (GNSS) receiver with a radio access technology (RAT) transceiver is presented. The method may include receiving, by a coexistence manager, from the RAT transceiver, an indication of a characteristic of the RAT transceiver for a scheduled operating event. The method may include selecting, by the coexistence manager, a space vehicle of a GNSS to use for a location determination by the GNSS receiver based on the characteristic of the RAT transceiver for the operating event. The method may include receiving, by the GNSS receiver, a signal from the space vehicle of the GNSS during the operating event of the RAT transceiver. The method may include performing, by the GNSS receiver, the location determination using the signal received from the space vehicle of the GNSS received during the operating event of the RAT transceiver.

Embodiments of such a method may include one or more of the following: Selecting, by the coexistence manager, the space vehicle of the GNSS to use for a location determination by the GNSS receiver may include determining, by the coexistence manager, an ordering of a plurality of space vehicles based on the characteristic of the RAT transceiver for the scheduled operating event. It may also include selecting, by the coexistence manager, the space vehicle of the GNSS based on the ordering of the plurality of space vehicles. The method may include determining, by the coexistence manager, signals from a sufficient number of space vehicles will not be acquired based on the characteristic of the RAT transceiver received by the coexistence manager. The method may include transmitting, by the coexistence manager, a message to the RAT transceiver that recommends limiting a transmit power level for the scheduled operating event such that signals from a sufficient number of space vehicles will be acquired during the operating event of the RAT transceiver.

Additionally or alternatively, embodiments of such a method may include one or more of the following: The method may include calculating, by the coexistence manager, an order of a plurality of space vehicles, wherein the order is based on a magnitude of effect of the characteristic of the RAT transceiver for the operating event on the location determination of the GNSS receiver. Selecting the space vehicle of the GNSS to use for a location determination of the GNSS receiver may be based on the order. The method may include determining, by the coexistence manager, a time at which to schedule the operating event of the RAT transceiver to occur. The method may include transmitting, by the coexistence manager, to the RAT transceiver, a message that recommends the time for the operating event to occur. The method may include determining, by the coexistence manager, a frequency at which the operating event of the RAT transceiver is to occur. The method may include transmitting, by the coexistence manager, to the RAT transceiver, a message that recommends the frequency to use for the operating event. The method may include determining, by the coexistence manager, a power level for the operating event. The method may include transmitting, by the coexistence manager, to the RAT transceiver, a message that recommends the power level for the operating event. The method may include selecting, by the coexistence manager, the GNSS from a plurality of global navigation satellite systems available for location determination based on the characteristic of the RAT transceiver for the operating event. Selection of the space vehicle of the GNSS to use for the location determination of the GNSS receiver occurs may be within a preselected GNSS. The characteristic of the RAT transceiver may be selected from the group consisting of: a planned time window; a polarization; a planned frequency; and a planned power level. The coexistence manager may be integrated with the GNSS receiver.

In some embodiments, a system for managing coexistence of a global navigation satellite system (GNSS) receiver with a radio access technology (RAT) transceiver is presented. The system may include a coexistence manager. The coexistence manager may be configured to receive, from the RAT transceiver, an indication of a characteristic of the RAT transceiver for a scheduled operating event. The coexistence manager may be configured to select, a space vehicle of a GNSS to use for a location determination by the GNSS receiver based on the characteristic of the RAT transceiver for the operating event. The system may include a GNSS receiver. The GNSS receiver may be configured to receive a signal from the space vehicle of the GNSS during the operating event of the RAT transceiver. The GNSS receiver may be configured to perform the location determination using the signal received from the space vehicle of the GNSS received during the operating event of the RAT transceiver.

Embodiments of such a system may include one or more of the following features: The coexistence manager being configured to select the space vehicle of the GNSS to use for a location determination by the GNSS receiver may include the coexistence manager being configured to: determine an ordering of a plurality of space vehicles based on the characteristic of the RAT transceiver for the scheduled operating event; and select the space vehicle of the GNSS based on the ordering of the plurality of space vehicles. The coexistence manager may be configured to determine signals from a sufficient number of space vehicles will not be acquired based on the characteristic of the RAT transceiver received by the coexistence manager. The coexistence manager may be configured to transmit a message to the RAT transceiver that recommends limiting a transmit power level for the scheduled operating event such that signals from a sufficient number of space vehicles will be acquired during the operating event of the RAT transceiver. The coexistence manager may be configured to calculate an order of a plurality of space vehicles, wherein the order is based on a magnitude of effect of the characteristic of the RAT transceiver for the operating event on the location determination of the GNSS receiver. Selection of the space vehicle of the GNSS to use for a location determination of the GNSS receiver may be based on the order.

Additionally or alternatively, embodiments of such a system may include one or more of the following features: The coexistence manager may be configured to determine a time at which to schedule the operating event of the RAT transceiver to occur. The coexistence manager may be configured to transmit to the RAT transceiver, a message that recommends the time for the operating event to occur. The coexistence manager may be configured to determine a frequency at which the operating event of the RAT transceiver is to occur. The coexistence manager may be configured to transmit, to the RAT transceiver, a message that recommends the frequency to use for the operating event. The coexistence manager may be configured to determine a power level for the operating event. The coexistence manager may be configured to transmit, to the RAT transceiver, a message that recommends the power level for the operating event. The coexistence manager may be configured to select the GNSS from a plurality of global navigation satellite systems available for location determination, based on the characteristic of the RAT transceiver for the operating event. The coexistence manager may be configured to select the space vehicle of the GNSS to use for the location determination of the GNSS receiver occurs within a preselected GNSS. The coexistence manager may be integrated with (e.g., onboard) the GNSS receiver. The coexistence manager may be implemented in a processor separate from the GNSS receiver.

In some embodiments, an apparatus for managing coexistence of a global navigation satellite system (GNSS) receiver with a radio access technology (RAT) transceiver. The apparatus may include means for receiving, from the RAT transceiver, an indication of a characteristic of the RAT transceiver for a scheduled operating event. The apparatus may include means for selecting a space vehicle of a GNSS to use for a location determination by the GNSS receiver based on the characteristic of the RAT transceiver for the operating event. The apparatus may include means for receiving a signal from the space vehicle of the GNSS during the operating event of the RAT transceiver. The apparatus may include means for performing the location determination using the signal received from the space vehicle of the GNSS received during the operating event of the RAT transceiver.

Embodiments of such an apparatus may include one or more of the following features: The means for selecting the space vehicle of the GNSS to use for a location determination by the GNSS receiver may include: means for determining an ordering of a plurality of space vehicles based on the characteristic of the RAT transceiver for the scheduled operating event; and means for selecting the space vehicle of the GNSS based on the ordering of the plurality of space vehicles. The apparatus may include means for determining signals from a sufficient number of space vehicles will not be acquired based on the characteristic of the RAT transceiver received by the coexistence manager. The apparatus may include means for transmitting a message to the RAT transceiver that recommends limiting a transmit power level for the scheduled operating event such that signals from a sufficient number of space vehicles will be acquired during the operating event of the RAT transceiver. The apparatus may include means for calculating an order of a plurality of space vehicles, wherein the order is based on a magnitude of effect of the characteristic of the RAT transceiver for the operating event on the location determination of the GNSS receiver. The means for selecting the space vehicle of the GNSS to use for a location determination of the GNSS receiver may be based on the order. The apparatus may include means for determining a time at which to schedule the operating event of the RAT transceiver to occur. The apparatus may include means for transmitting to the RAT transceiver, a message that recommends the time for the operating event to occur.

In some embodiments, a non-transitory processor-readable medium for managing coexistence of a global navigation satellite system (GNSS) receiver with a radio access technology (RAT) transceiver is presented. The non-transitory processor-readable medium may include processor-readable instructions configured to cause one or more processors to receive, from the RAT transceiver, an indication of a characteristic of the RAT transceiver for a scheduled operating event. The instructions may be configured to cause the one or more processors to select, a space vehicle of a GNSS to use for a location determination by the GNSS receiver based on the characteristic of the RAT transceiver for the operating event. The instructions may be configured to cause the one or more processors to receive, a signal from the space vehicle of the GNSS during the operating event of the RAT transceiver. The instructions may be configured to cause the one or more processors to perform, the location determination using the signal received from the space vehicle of the GNSS received during the operating event of the RAT transceiver.

Embodiments of such a non-transitory processor-readable medium may include one or more of the following: When executed, the instructions that cause the one or more processors to select the space vehicle of the GNSS to use for a location determination by the GNSS receiver may include processor-readable instructions which, when executed, cause the one or more processors to determine an ordering of a plurality of space vehicles based on the characteristic of the RAT transceiver for the scheduled operating event; and select the space vehicle of the GNSS based on the ordering of the plurality of space vehicles. The instructions, when executed, may cause the one or more processors to determine signals from a sufficient number of space vehicles will not be acquired, based on the characteristic of the RAT transceiver received by the coexistence manager. The instructions, when executed, may cause the one or more processors to transmit a message to the RAT transceiver that recommends limiting a transmit power level for the scheduled operating event such that signals from a sufficient number of space vehicles will be acquired during the operating event of the RAT transceiver.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
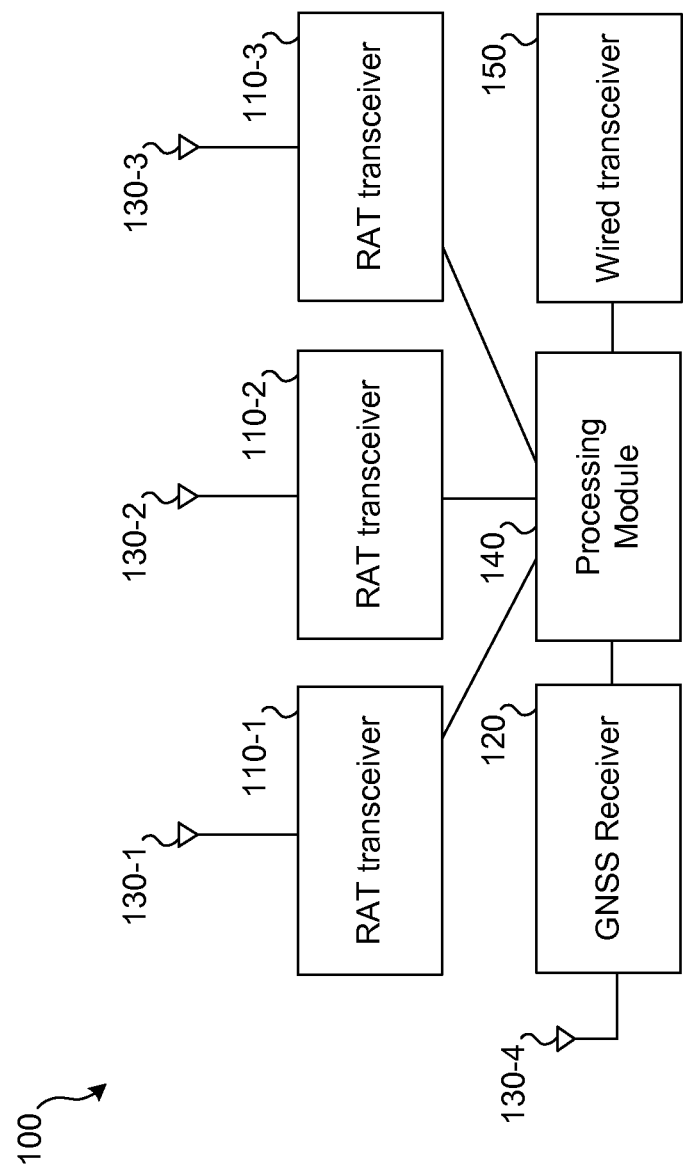
FIG. 1 illustrates an embodiment of a system that includes a GNSS receiver and multiple RAT transceivers.

Rather than having a global navigation satellite system (GNSS) receiver blank or otherwise ignore GNSS signals while one or more radio access technology (RAT) transceivers are transmitting, an analysis can be performed by a Coexistence Manager (CxM) to determine how to handle location (position) determination and/or transmissions by the one or more RAT transceivers. While one or more RAT transceivers are transmitting, it may be desirable to determine the location of a mobile device, on which the one or more RAT transceivers and the GNSS receiver are located. Such location determination may be desirable even if some amount of interference with the reception of GNSS signals by the GNSS receiver occurs due to one or more RAT transceivers transmitting wireless signals.

Many factors may affect whether a RAT transceiver's transmissions cause substantial interference with the reception of GNSS signals by a GNSS receiver. In some situations, the frequency being used by the RAT transceiver may cause little or no interference with the GNSS receiver. In some situations, the RAT transceiver may be transmitting at a low enough power that the RAT transceiver may cause little or no interference with the GNSS receiver. In other situations, the RAT transceiver's spectral emissions or harmonics may cause interference with the GNSS receiver. When multiple RAT transceivers of a device are transmitting at a same time, various harmonic and/or intermodulation frequencies may be created that can cause interference with the GNSS receiver.

To avoid interference from one or more RAT transceivers, a GNSS receiver with an integrated CxM (or in communication with a separate CxM) may be able to select GNSS signals output from space vehicles (SVs) that are the least impacted by the interference from the one or more RAT transceivers. Specifically, the CxM may select GNSS signals from specific space vehicles (SVs) that have a higher signal-to-noise ratio (SNR), such as due to the power level of the signal output by the SV or due to the proximity of the SV. The GNSS receiver may also be able to select among multiple GNSS constellations (e.g., GPS, GLONASS, Galileo), which operate on different frequencies and have other differing operating characteristics, to avoid interference from one or more RAT transceivers. As the transmit environment changes (that is, which RAT transceivers are transmitting, on which frequencies, and at which power level), the GNSS receiver may adjust which GNSS signals (possibly among multiple GNSS constellations) are received and are used for location determination while the one or more RAT transceivers are transmitting.

The CxM, which may be integrated with the GNSS receiver or may be a separate component in communication with the GNSS receiver and the one or more RAT transceivers, may be further configured to issue commands to the one or more RAT transceivers. The commands may define power levels, frequencies, and/or time periods (also referred to as time windows) during which the RAT transceivers are permitted to transmit. Whether a CxM issues commands to the one or more RATs that affect the transmit characteristics of the one or more RATs may be based on whether the CxM anticipates the GNSS receiver being able to successfully receive and process GNSS signals from a sufficient number of SVs (typically at least 3 or 4) while the one or more RATs are transmitting. If such reception and processing are expected to be successful, no adjustments in the transmit characteristics of the one or more RAT transceivers may be necessary.

FIG. 1 illustrates an embodiment of a system 100 that includes a GNSS receiver and multiple RAT transceivers. System 100 includes three RAT transceivers 110-1, 110-2, and 110-3, GNSS receiver 120, antennas 130-1, 130-2, 130-3, and 130-4, processing module 140, and wired transceiver 150. System 100 may be present onboard a mobile, wireless device. For instance, system 100 may be found in a cellular telephone, tablet computer, or some other device that is capable of determining its position using a GNSS receiver and communicating via one or more RAT transceivers. The device on which system 100 may be found can be referred to, for example, as user equipment or a mobile station. In addition to cellular phones, such a system may be present on a dedicated GNSS receiver device, such as a car navigation device.

In system 100, three RAT transceivers 110 are present. At various times, each of these RAT transceivers 110 may transmit signals wirelessly via associated antennas 130. RAT transceivers 110 may be transmitting while no other RAT transceiver is transmitting or may transmit concurrently while one or more other RAT transceivers of RAT transceivers 110 are transmitting. Therefore, at a given time, zero, one, or more than one RAT transceivers of RAT transceivers 110 may be transmitting wireless signals.

Each of RAT transceivers 110 may correspond to a different wireless technology/protocol. For example, RAT transceiver 110-1 may correspond to a cellular communication protocol, such as 4G LTE, 3G, or GSM. RAT transceiver 110-2 may correspond to a wireless local area network protocol such as 802.11a/b/g. RAT transceiver 110-3 may correspond to a device-to-device communication technology/protocol, such as Bluetooth®. In some embodiments, one or more RAT transceivers may correspond to the same technology/protocol. While the illustrated embodiment of system 100 contains three RAT transceivers, it should be understood that this is for exemplary purposes only; one, two, or more than three RAT transceivers may be present in alternate embodiments of system 100.

Each of RAT transceivers 110 may be associated with an antenna. RAT transceiver 110-1 may use antenna 130-1 to transmit (and, possibly, receive) wireless signals; RAT transceiver 110-2 may use antenna 130-2 to transmit (and, possibly, receive) wireless signals; and RAT transceiver 110-3 may use antenna 130-3 to transmit (and, possibly, receive) wireless signals. In some embodiments, two or more RAT transceivers of RAT transceivers 110 may share a single antenna. Also, one or more RAT transceivers of RAT transceivers 110 may transmit using two or more antennas. A RAT transceiver of RAT transceivers 110 may be permitted to switch transmission from a first antenna to a second antenna. In some embodiments, it may also be possible that GNSS receiver 120 may share an antenna with one or more RAT transceivers 110.

RAT transceivers 110 may be in communication with processing module 140. Data may be received from processing module 140 for transmission and received data may be provided to processing module 140. Processing module 140 may represent one or more processors in communication with non-transitory processor-readable memory. Processing module 140 may be responsible for execution of a high-level operating system (HLOS) and/or the execution of one or more applications that use one or more RAT transceivers of RAT transceivers 110 to transmit data and/or uses locations determined by GNSS receiver 120.

GNSS receiver 120 may be a standalone component (e.g., a separate integrated circuit chip) or may be a part of a processor of processing module 140. For instance, some processors can have a GNSS receiver onboard. Whether integrated into a multi-purpose processor or a standalone component, GNSS receiver 120 is capable of determining its position based on received GNSS signals. Such GNSS signals may be received via antenna 130-4. Antenna 130-4 may be dedicated to GNSS receiver 120 or may be shared with one or more other components, such as one or more of RAT transceivers 110.

Any of RAT transceivers 110 transmitting may or may not interfere with successful reception and processing of GNSS signals by GNSS receiver 120. Whether any or sufficient interference occurs to affect the performance (e.g., reception and processing) of GNSS receiver 120 may be dependent on various operating characteristics of each RAT transceiver: the frequency on which the RAT transceiver is transmitting, the power level at which the RAT transceiver is transmitting, and/or which antenna the RAT transceiver is using. When two or more RAT transceivers of RAT transceivers 110 are transmitting concurrently, interference at one or more harmonic frequencies may be created that otherwise would not exist. Interference at such frequencies may not be created if each of the RAT transceivers transmitting was transmitting during a different time period.

In addition to interference being caused by RAT transceivers 110, interference may be caused by one or more wired transceivers, such as wired transceiver 150. A wired transceiver 150 may be configured to transmit and/or receive data via a connected wire, such as via a USB3 wired connector and protocol. While a single wired transceiver 150 is depicted in FIG. 1, it should be understood that no wired transceivers or more than one wired transceiver may be present. Wired transceiver 150 may be in communication with processing module 140. Data may be received from processing module 140 for transmission and received data may be provided to processing module 140.

While this document focuses on communication between RAT transceivers 110, GNSS receiver 120, and a CxM (as described in relation to FIGS. 2 and 3), it should be understood that one or more wired transceivers 150 may produce interference and may be controlled to help reduce or mitigate interference. A wired transceiver, similar to a RAT transceiver, may provide a CxM an indication of an upcoming operating event. As such, embodiments detailed herein related to RAT transceivers 110 may be applicable to one or more wired transceivers 150. For instance, a mobile device having system 100 onboard may have one or more RAT transceivers 110 and/or may have one or more wired transceivers, such as wired transceiver 150. Regarding wired transmitters, USB an PCIe interfaces are forms of wired transceivers and receivers may cause interference. Further, embodiments detailed herein may be applicable when no RAT transceivers and/or no wired transceivers are present or operating. In such embodiments, interference may be caused by other sources, such as power supplies, external devices, and/or other internal componentry.

Whether or not any or sufficient interference occurs to affect the performance of GNSS receiver 120 may be further dependent on the current operating characteristics of GNSS receiver 120. The proximity (distance) between GNSS receiver 120 (and antenna 130-4) to the GNSS SVs from which GNSS signals are being received and processed may affect how much interference can be tolerated. The GNSS constellation and/or the specific SVs within the constellation being used may affect how interference affects the GNSS receiver because of different frequencies, power levels, SV health, obstructions (due to the direction of the constellation's SVs in relation to the GNSS receiver), and/or orthogonality scheme.

While not illustrated in FIG. 1, communication directly between GNSS receiver 120 and one or more RAT transceivers of RAT transceivers 110 may be possible. Such communication may permit instructions to be sent from GNSS receiver 120 to the one or more RAT transceivers. Further, data may be transmitted from one or more RAT transceivers of RAT transceivers 110 to GNSS receiver 120.

Figure 2:
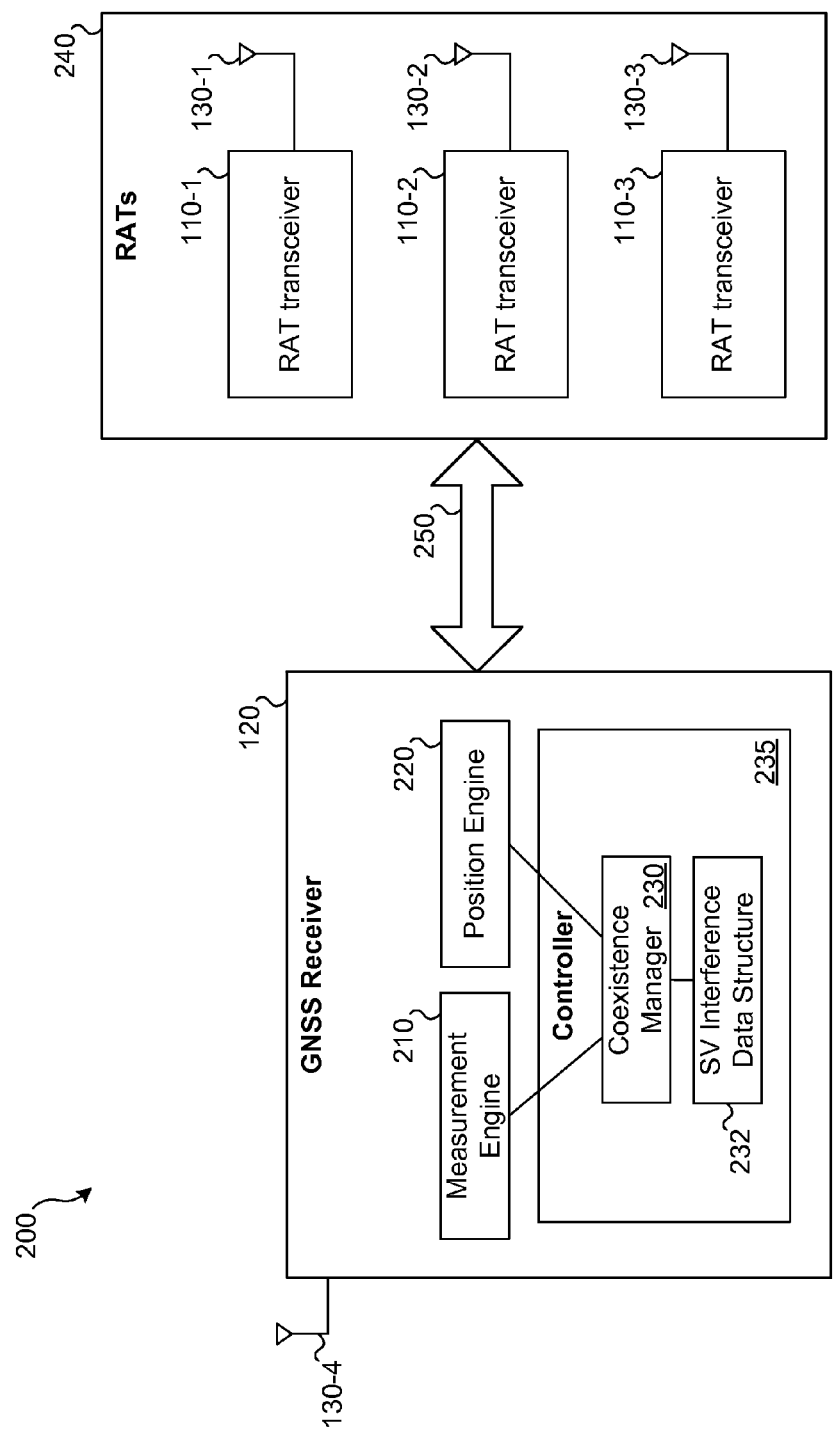
FIG. 2 illustrates an embodiment of a system having a coexistence manager (CxM) as part of a GNSS receiver.

In some embodiments, a CxM may be integrated as part of a GNSS receiver. For instance, GNSS receiver 120 may have an integrated CxM. FIG. 2 illustrates an embodiment of a system 200 having a coexistence manager as part of a GNSS receiver. System 200 may include: GNSS receiver 120, RATs 240, and communication interface 250. System 200 may represent an embodiment of system 100 of FIG. 1.

As illustrated, RATs 240 include three RAT transceivers 110 and associated antennas 130. It should be understood that, in other embodiments, fewer or greater numbers of RAT transceivers and/or antennas may be present. Some or all of RAT transceivers 110 may be configured to receive commands from and/or transmit data to GNSS receiver 120. Some or all RAT transceivers may be configured to provide GNSS receiver 120 information about one or more upcoming transmissions. The information (which may be referred to as a characteristic) about the one or more upcoming transmissions may include: the time of the start of the transmission, end time of the transmission, and/or time window (also referred to as the time period) of the transmission; an indication of the RAT; the frequency of the transmission; and/or the power level of the transmission. Some or all RAT transceivers may be configured to receive commands from GNSS receiver 120. The commands may include: an allowable transmission power level; one or more allowable frequencies; and/or one or more allowable transmission times.

GNSS receiver 120 may include: measurement engine 210, position engine 220, and coexistence manager (CxM) 230 implemented as part of controller 235. A measurement engine 210 can process the timing data received via an antenna from multiple satellites of one or more global navigation satellite systems. Based on the received timing data, correlators can be used to determine timing information by the measurement engine. Based on the calculated timing information using the correlators, a pseudorange can be determined by measurement engine 210.

The pseudorange calculations made by measurement engine 210 may be output (e.g., to another component, an application being executed, or a high-level operating system) and/or may be passed to position engine 220. Position engine 220, based on the pseudorange calculations from measurement engine 210, may determine a location of GNSS receiver 120 in the form of coordinates. These coordinates may be provided to an application and/or high level operating system being executed by a host processor for use as a location of GNSS receiver 120 or, more generally, as the location of the device that includes system 200, such as a cellular phone or tablet computer.

CxM 230 may be part of a controller 235 of GNSS receiver 120. In addition to performing other functions, controller 235 may perform the functions of CxM 230. CxM 230 may serve to manage a GNSS-based location determination such that a location of GNSS receiver 120 can be determined while operation events are occurring at one or more RATs 240.

CxM 230 may be configured to maintain an SV interference data structure 232 that indicates an amount of interference experienced by GNSS receiver 120 when various RAT transceiver operating events are occurring. For instance entries may be created and periodically updated in SV interference data structure 232 that classifies specific operating events at RAT transceivers 110. Entries may be maintained not only for operating events of specific RAT transceivers of RAT transceivers 110, but also for combinations of multiple RAT transceivers of RAT transceivers 110. Such combinations may be important due to additional interference caused by intermodulation effects that can occur when two or more RAT transceivers 110 are transmitting at a same time. SV interference data structure 232 may maintain information about the amount of interference received by GNSS receiver 120 when a RAT transceiver is transmitting at specific frequencies and/or specific power levels. SV interference data structure 232 may also maintain information about the amount of interference received by GNSS receiver 120 for other forms of operating events performed by RAT transceivers 110 besides transmit events. For instance, receive events may also cause an amount of interference to be experienced by GNSS receiver 120.

Table 1, presented below, is a simplified, exemplary table that can represent SV interference data structure 232 that may be maintained by CxM 230. Such a data structure may be maintained for each SV from which the GNSS receiver receives GNSS signals. It should be understood that this table is merely exemplary and other embodiments may contain additional or less information and/or may be maintained in a different format.

TABLE 1

SV Interference

| SV-1 (of a specific GNSS) | Frequency | Power Level | Interference |
|---|---|---|---|
| RAT 1 - Transmit Event | f1 MHz | P1 dBm | I1 dB |
| RAT 2 - Transmit Event | f2 MHz | P2 dBm | I2 dB |
| RAT 1 and 2 - Transmit Events | f3 MHz | P3 dBm | I3 dB |
| RAT 1 - Receive Event | f4 MHz | P4 dBm | I4 dB |
| RAT 1, 2, and 3 - Transmit Event | f5 MHz | P5 dBm | I5 dB |
| RAT 3 - Transmit Event | f6 MHz | P6 dBm | I6 dB |

Many more entries may be present and may be updated as the operating events occur. Table 1 is organized by SV. Therefore, for each SV in each GNSS used by the GNSS receiver, a separate table may be maintained. Table 1 provides an entry for each combination of transmitting RATs (e.g., including harmonic and intermodulation effects). Separate entries may be maintained for different transmit frequencies and/or different transmit power levels at which RAT transceivers may operate. It should be understood that for each entry, interference may be created on multiple frequencies, such as due to harmonic frequencies. As an example of this, an LTE RAT transmitter may transmit in a frequency band around 777-798 MHz. The second harmonic of this transmit band, around 1600 MHz, may fall within a frequency band used for GNSS signals, thus potentially resulting in interference. As another example, a RAT operating around 800 MHZ (e.g., for communicating with a WWAN) and a second RAT operating around 2.4 GHz (e.g., for communicating with a WLAN) may result in interference around 1600 MHz, which may fall within a frequency band used for GNSS signals. In addition, an LTE RAT transceiver may transmit using carrier aggregation of multiple bands which could cause intermodulation and cross-modulation between the multiple carriers causing interference to the GNSS receiver. It should be understood that, due to differing operating characteristics of different SVs and GNSSs, interference may vary in effect on different SVs. For instance, a first satellite of a GNSS may be less affected than a second SV of the same or different GNSS due to different operating parameters of the SVs (e.g., the SVs may transmit GNSS signals at different frequencies). In order to create and/or update entries for such an SV interference data structure, CxM 230 may measure the amount of interference or noise present when such a RAT operating event is occurring.

While Table 1 is organized by SV, it should be understood that this is merely an exemplary embodiment. For instance, in some embodiments, separate tables may be maintained for operating events occurs on multiple RATs at a given time. Therefore, if two RATs are transmitting at a given time, a certain table may be used to determine the likely amount of interference. Various entries may be maintained for different frequencies and/or power levels used for transmitting by such RATs. As another example, a table that includes data for multiple SVs may be maintained for a particular transmit power level of a particular RAT. Therefore, if the single particular RAT is scheduled to transmit at the given power level (and, possibly, frequency) associated with a particular table, that table may be used for determining the likely amount of interference for various SVs. Other variations in storing data used to anticipate the amount of interference that can be expected in various situations are also possible.

In some embodiments, the polarization of GNSS signals may affect the ability to be received. For instance, some global navigation satellite systems may have circular polarization or linear polarization. Depending on the interference environment, the form of polarization used by a GNSS may affect the ability of signals from the GNSS to be received. As such, in some embodiments, polarization may be used as a factor in selecting a GNSS or a specific SV of a GNSS.

In addition to the interference caused by RATs due to effects such as harmonics, nonlinear mixer intermodulation distortion (e.g., due to a wideband transmit by a RAT transmitter), wideband spurious noise from transmit spectral spillage, continuous wave spurs or jammers from coupling mechanisms, and/or local oscillator spurs due to reciprocal mixing may all cause interference to occur in frequency bands on which GNSS signals are received. Data due to such effects may be maintained in an SV data structure similar to as detailed in relation to table 1.

In some embodiments, rather than having SV interference data structure 232 that is updated by CxM 230, an SV interference data structure may be provided to CxM 230 that defines values measured or calculated by another entity. For instance, a manufacturer of GNSS receiver 120 may provide predefined values for such an SV interference data structure. In some embodiments, such predefined values are provided, but can be updated by CxM 230 as noise or interference levels are measured during operation of GNSS receiver 120. In some embodiments, SV interference data structure 232 may not be stored onboard controller 235, but rather may be stored external to GNSS receiver 120, such as in an accessible non-transitory computer-readable storage medium, such as system memory (e.g., working memory 735 of FIG. 7).

Since a SV interference data structure is maintained by the CxM, different interference environments can be adapted to. For example, if implemented in cellular phones, the specific interference experienced by the GNSS receiver may vary based on the design of a specific make/model of cellular phone. Use of an SV interference data structure can allow for the specific interference environment of various makes, models, and types of devices to be adapted to by a SV interference data structure being maintained (or created) for the device.

GNSS receiver 120 may be configured to communicate with RATs 240 via a communication interface 250, which may utilize serial, parallel, or some other data transmission format. Communication interface 250 may permit information to be transmitted from RATs 240 to GNSS receiver 120. Communication interface may also permit information to be transmitted from GNSS receiver 120 to RATs 240. Some or all of RATs 240 may transmit data to GNSS receiver 120 that indicates one or more characteristics about an operating event that is scheduled to occur. The one or more characteristics transmitted may include an indication of the type of operating event (e.g., a transmit event, a receive event, etc.), the frequency at which the event will occur (if relevant), the power level at which the event will occur (if relevant), and/or a time (and/or duration) at which the event will occur. In some embodiments, at least some of this data may be inferred by GNSS receiver 120 based on the RAT transceiver from which the characteristics were received. For instance, it may be assumed that a transmit event will occur 10 ms after such information was received by GNSS receiver 120 if transmitted by a RAT transceiver that communicates wirelessly with a specific cellular network.

Such information received by GNSS receiver 120 via a communication interface 250 from one or more of RATs 240 may be used by CxM 230 to assess: whether GNSS signals from sufficient SVs will be received, which SVs (of which GNSS) should be used, and/or if a request should be made to one or more RATs, via communication interface 250, to alter one or more upcoming operating events.

CxM 230 may access an SV interference data structure, such as presented in Table 1, to determine if a scheduled event of one or more RATs will sufficiently affect reception of GNSS signals from an SV by GNSS receiver 120. GNSS signals from multiple SVs may be assessed. CxM 230 may alter which GNSS signals of which SVs are used for location determination based on such analysis. If altering which GNSS signals are used will be insufficient to receive sufficient GNSS signals, CxM may transmit a command to one or more of RATs 240 to alter one or more upcoming operating events. Such commands may be required to be performed by the RATs or may be in the form of recommendations. If the commands are recommendations, the RAT to which the command is addressed may assess whether it should comply with the command. In some embodiments, an application or high level operating system (HLOS) may provide an indication as to whether RAT operating events or location determination performed by the GNSS receiver 120 should be given priority. If GNSS receiver 120 has priority, the RAT transceiver may be required to abide by a command received from GNSS receiver 120. If the relevant RAT of RATs 240 has priority, the relevant RAT may ignore the command from GNSS receiver 120.

The commands sent by GNSS receiver 120, which are generated by coexistence manger 230, may include instructions to a RAT transceiver regarding: decreasing a transmit power level, delaying (rescheduling) or canceling a transmit, and/or altering a transmit frequency. Such commands may be relevant to various types of operating events of a RAT, such as transmit events and acknowledgements occurring during receive events.

In system 200, a single GNSS receiver 120 is present. It should be understood that, in other embodiments of system 200 (or system 300), multiple GNSS receivers may be present. Two or more GNSS receivers may be present in various embodiments. Such GNSS receivers may be configured to share resources and pseudorange calculations. For example, U.S. patent application Ser. No. 14/163,625, entitled "Method and Systems for Multi-GNSS Operation," filed on Jan. 24, 2014, the entire disclosure of which is hereby incorporated by reference for all purposes, discloses various arrangements for using multiple GNSS receivers in combination.

Figure 3:
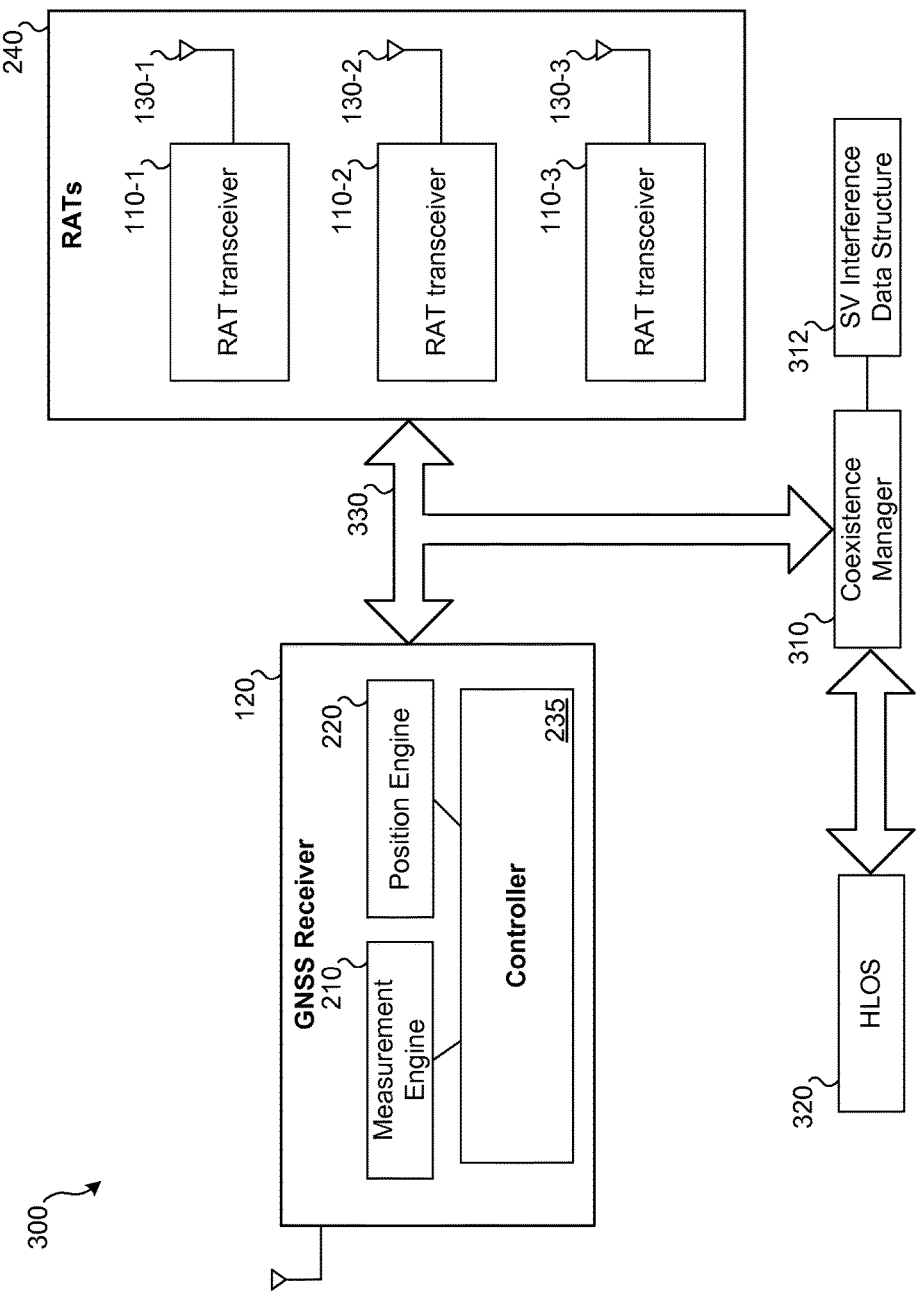
FIG. 3 illustrates an embodiment of a system having a coexistence manager separate from a GNSS receiver.

In some embodiments, a CxM may be separate from GNSS receiver 120. For instance, GNSS receiver 120 may reside on a different integrated chip. FIG. 3 illustrates an embodiment of a system 300 having a CxM separate from a GNSS receiver. System 300 may include: GNSS receiver 120, RATs 240, CxM 310, high level operating system (HLOS) 320, and communication interface 330. System 300 may represent an embodiment of system 100 of FIG. 1.

The components of system 300 may function substantially similarly to system 200 of FIG. 2. For instance, CxM 310 may perform all of the functions of CxM 230. However, rather than the CxM being part of GNSS receiver 120, CxM 310 is separate. In some embodiments, CxM 310 may be implemented as hardware, firmware or software executed by a general-purpose processor. In some embodiments, CxM 310 is executed by the host, which refers to the processor handling executing of the highlevel operating system (HLOS). In some embodiments, CxM 310 may be a stand-alone component (e.g., a separate controller) or may be incorporated into another component, such as a specialized or general-purpose processor. CxM 310 may receive information about upcoming operating events from RATs 240 and may receive information from GNSS receiver 120 about the status of location determination. CxM 310 may receive information output by control 235 of GNSS receiver 120 about the received power level of various SVs. CxM 310 may maintain SV interference data structure 312 as detailed in relation to CxM 230. SV interference data structure 312 may be onboard CxM 310 or may be stored in another location and accessible by CxM 310. In some embodiments, the SV interference data structure may be maintained by controller 235 of GNSS receiver 120 and CxM 310 may receive information from the controller retrieved from SV interference data structure 312.

CxM 310 may communicate with controller 235 of GNSS receiver 120 and RATs 240 via communication interface 330

(or via two separate communication interfaces). Such a communication interface may permit serial, parallel, or some other form of data transmission to occur among the components. In some embodiments, GNSS receiver 120 can receive data from and transmit data to CxM 310; RATs 240 can receive data from and transmit data to CxM 310; however GNSS receiver 120 and RATs 240 may not communicate with each other directly.

CxM 310 may communicate with a high level operating system (HLOS) 320 and/or one or more applications being executed by HLOS 320. HLOS 320 may instruct CxM 310 whether preference should be given to location determination or to operating events of RATs 240. Based on such instructions from HLOS 320, CxM 310 may instruct RATs 240 to enforce any commands transmitted to RATs 240 on behalf of GNSS receiver 120. Based on instructions from HLOS 320 that indicate preference is to be given to RAT functions, CxM 310 may instruct RATs 240 that commands transmitted to RATs 240 on behalf of GNSS receiver 120 may be optional (e.g., are only enforced if the effect on RATs 240 is minimal). Specific RATs may be given preference over GNSS receiver 120 by HLOS 320; similarly, GNSS receiver 120 may be given preference over specific RATs of RATs 240, such as depending on the applications being executed via HLOS 320. HLOS 320 may provide CxM 310 with specific rules to enforce, such as a rule that indicates that no more than a defined amount of time is to elapse without giving GNSS receiver 120 full preference for location determination. While not illustrated in system 200, it should be understood that CxM 230 may communicate with an HLOS also.

Figure 4:
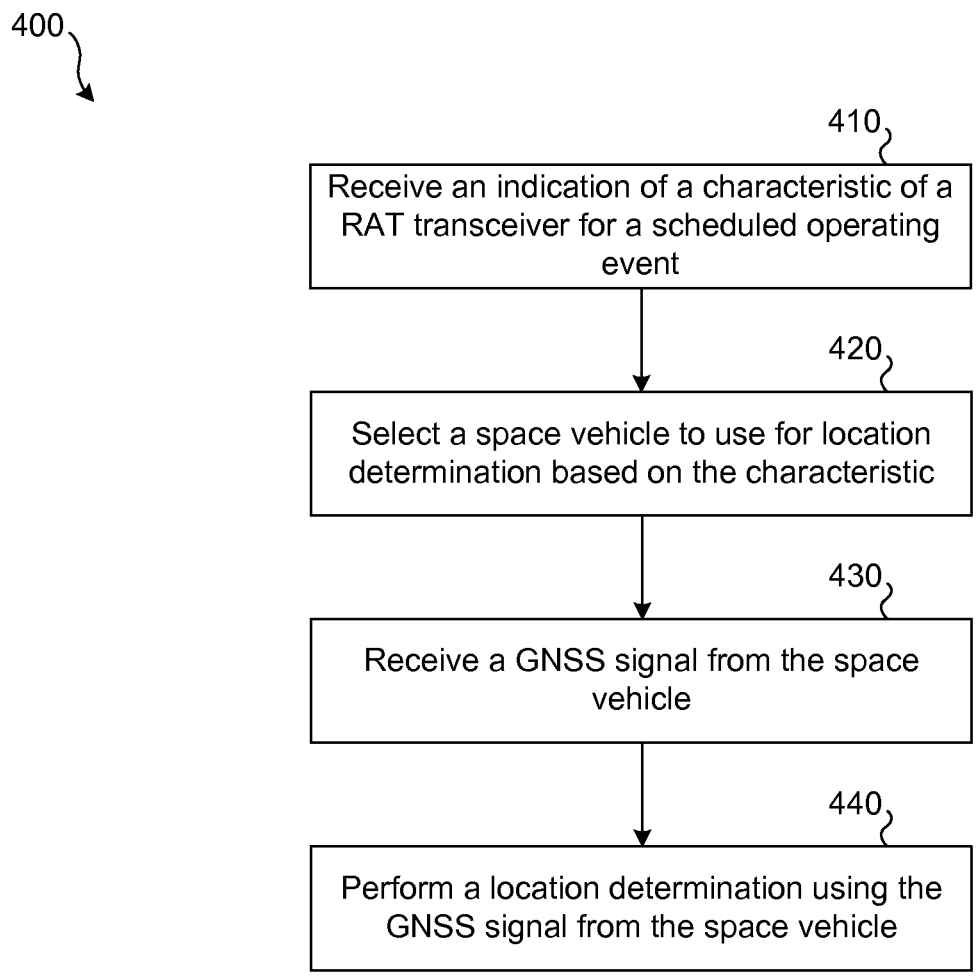
FIG. 4 illustrates an embodiment of a method for managing the coexistence of a GNSS receiver with one or more RAT transceivers.

Various methods may be performed using the systems of FIGS. 1-3. FIG. 4 illustrates an embodiment of a method 400 for managing the coexistence of a GNSS receiver with one or more RAT transceivers. Blocks of method 400 may be performed by a CxM, which may be part of a GNSS receiver (e.g., system 200 of FIG. 2) or may be separate from a GNSS receiver (e.g., system 300 of FIG. 3). If separate from a GNSS receiver, a CxM may be a stand-alone component or may be integrated as part of a processor. Blocks of method 400 may also be performed by a GNSS receiver. Accordingly, means for performing blocks of method 400 can include a CxM implemented on a GNSS receiver or separately, a GNSS receiver, a communication interface, and/or one or more separate processors.

At block 410, an indication of a characteristic of an RAT transceiver for a scheduled operating event may be received. The characteristic of the RAT transceiver may be indicative of: the type of RAT transceiver, a time and/or duration of an operating event, a type of operating event (e.g., transmit event, receive event), a frequency on which the operating event will occur, a power level at which the operating event will occur, and/or some data that may be indicative of interference that will be created. The operating event may occur at some time into the future. For instance, reception of the characteristic at block 410 may not be indicative that the event has begun. Rather, based on a time indicated by the characteristic or an expected time (e.g., based on from which RAT transceiver the characteristic is received) the transmit time can be determined. While at least one indication of a characteristic may be received, indications of multiple characteristics may be received. For instance, a time, frequency, and power level of a future transmit event may be received. In some embodiments, a characteristic may be received from a single RAT transceiver. In other embodiments, multiple characteristics from multiple RAT transceivers may be received.

At block 420, an SV may be selected based on the characteristic of the RAT transceiver (thus, meaning that GNSS signals from the SV are used for location determination). The SV may be selected from a GNSS currently being used for location determination. The SV may, in some instances, be selected from a different GNSS. The SV selected at block 420 may be the SV that is least likely to have interference during the scheduled upcoming operating event of the RAT transceiver. The SV may be determined to be the least likely to have interference based upon analysis of one or more SV interference data structures that indicates expected interference or noise levels for SVs based on the characteristic received from the RAT transceiver. As a simple example, if the characteristic received from the RAT transceiver is indicative of a transmission occurring on a particular frequency, the SV may be selected because it transmits GNSS signals on a frequency greatest in difference from the particular frequency as compared with other SVs. While block 420 focuses on the selection of a single SV, it should be understood that multiple SVs may be selected based on the characteristic received at block 410. For a GNSS receiver to determine its location, GNSS signals from 3, 4, or more SVs may be necessary. One or more of such SVs may be selected based on the characteristic received at block 410.

At block 430, a GNSS signal may be received from the SV selected at block 420. The GNSS signal received at block 430 may be received while the operating event is occurring at the RAT transceiver. For example, the RAT transceiver may be transmitting data (and, possibly, creating some amount of interference). The GNSS signal received at block 430 may be used in the performance of a location determination at block 440. Therefore, the location determination performed at block 440 occurs based on the GNSS signal received from the selected SV while the RAT transceiver operating event is occurring. Therefore, the occurrence of the RAT operating event did not prevent the GNSS receiver from performing a location determination at the same time. To perform the location determination at block 440, it may be required to GNSS signals to be received from at least three or four SVs. In some embodiments, a determination may be made as to the minimum number of SVs from which GNSS signals need to be received in order to determine a location of the GNSS receiver.

After the RAT transceiver event has concluded, an SV from which GNSS signals are received and used for location determination by the GNSS receiver may revert to the SV used prior to method 400 being performed. Alternately, the SVs from which GNSS signals are used for location determination may be maintained following the operating event of the RAT transceiver concluding.

Figure 5:
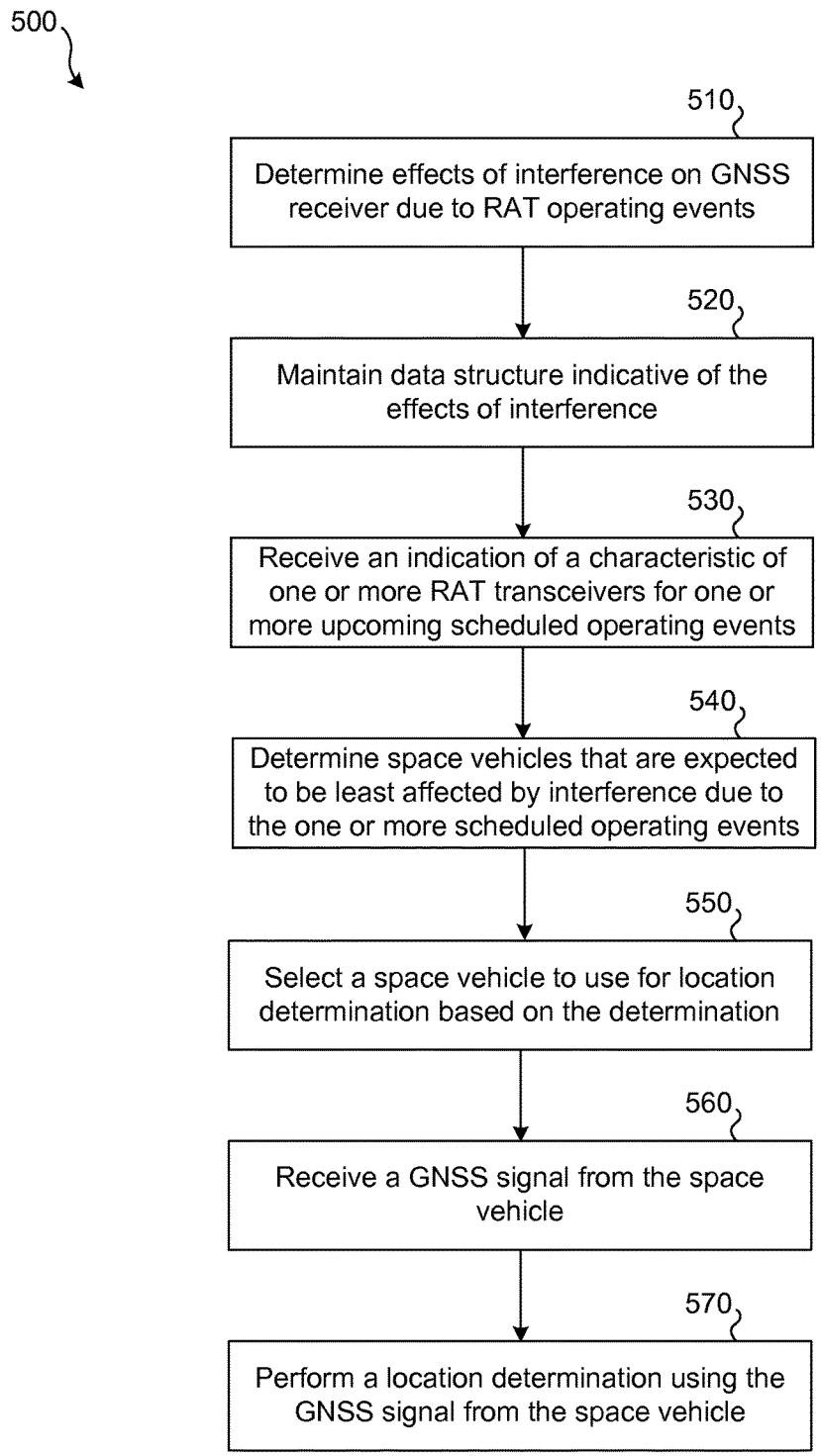
FIG. 5 illustrates an embodiment of a method for managing the coexistence of a GNSS receiver with one or more RAT transceivers based on a maintained data structure.

FIG. 5 illustrates an embodiment of a method 500 for managing the coexistence of a GNSS receiver with one or more RAT transceivers based on a maintained data structure. Blocks of method 500 may be performed by a CxM, which may be part of a GNSS receiver (e.g., system 200 of FIG. 2) or may be separate from a GNSS receiver (e.g., system 300 of FIG. 3). If separate from a GNSS receiver, a CxM may be a stand-alone component or may be integrated as part of a processor. One or more blocks of method 500 may also be performed by a GNSS receiver. Accordingly, means for performing blocks of method 500 can include a CxM implemented on a GNSS receiver, a GNSS receiver, a communication interface, and/or one or more separate processors. Method 500 may represent a more detailed embodiment of method 400 of FIG. 4.

At block 510, effects of interference on a GNSS receiver receiving (and processing) GNSS signals may be determined Operating events of one or more RAT transceivers may be monitored at or near the same time. As such, it can be determined the amount of interference or noise present at the GNSS receiver for various operating events of one or more RAT transceivers. In some embodiments, this may involve measurements being made during a RAT operating event. The measurements may be used to determine the SNR, RSSI, SINR, or some other form of signal strength measurement of a GNSS signal received by the GNSS receiver. In some embodiments, rather than measurements, the effects of interference may be based on predictive calculations and/or predefined values stored by the device.

Based upon the measured effects of interference, an SV interference data structure may be maintained at block 520. The SV interference data structure may be maintained by a CxM, which can be located onboard a GNSS receiver or may be external to the GNSS receiver and in communication with the GNSS receiver. The data structure may maintain information about the amount of interference present at the GNSS receiver for receiving GNSS signals while various RAT transceiver operating events are occurring. Separate noise or interference values may be maintained for different RAT transceivers. Separate noise or interference values may be maintained for different combinations of RAT transceivers that have concurrently occurring operating events. Separate noise or interference values may also be maintained, based on the frequency and/or transmit power level of the RAT transceivers. Separate noise or interference values may be stored in relation to different global navigation satellite systems and/or specific SVs. As interference or noise values are measured at block 510 in relation to received GNSS signals, these values may be used to update the data structure of block 520.

At block 530, an indication of a characteristic of an RAT transceiver for a scheduled operating event may be received. The characteristic may be received by a CxM, which is either onboard a GNSS receiver (e.g., as in FIG. 2) or separate (e.g., as in FIG. 3). The characteristic of the RAT transceiver may be indicative of: the type of RAT transceiver, a time and/or duration of an operating event, a type of operating event (e.g., transmit event, receive event), a frequency on which the operating event will occur, a power level at which the operating event will occur, and/or some data that may be indicative of interference that will be created. The operating event may be scheduled to occur at some time into the future. For instance, reception of the characteristic at block 530 may not be indicative that the event has begun. Rather, based on a time indicated by the characteristic or an expected time (e.g., based on when and/or from which RAT transceiver the characteristic is received) the transmit time can be determined. While at least one indication of a characteristic may be received, indications of multiple characteristics may be received. For instance, a time, frequency, and power level of a future transmit event may be received. In some embodiments, one or more characteristics may be received from a single RAT transceiver. In other embodiments, multiple characteristics from multiple RAT transceivers may be received.

At block 540, space vehicles that are expected to be the least affected by the conditions during the upcoming RAT operating event may be determined. The SVs may be selected, based on the one or more characteristics received at block 530 and an analysis of the data structure maintained at block 520. Therefore, based on the one or more characteristics that define an upcoming scheduled operating event of the RAT transceiver, an ordering of SVs may be determined. The ordering of SVs may be from least affected by the characteristic of the upcoming scheduled event to most affected. The SVs ordered may be for a specific GNSS being used by the GNSS receiver. Alternatively, SVs from multiple global navigation satellite systems may be ordered. An ordered list of least-affected SVs may be created by the CxM. The least-affected SVs may be based on the current SNR of the SV assessed in conjunction with the expected noise or interference as indicated in the data structure. In some embodiments, the data structure may indicate an expected SNR for if GNSS signals from the SV are used during the RAT transceiver operating event. Accordingly, following block 540, an ordering listing of SVs that are expected to be the least affected by the one or more characteristics received at block 530 may be determined using the data structure maintained at block 520.

At block 550, one or more SVs (of a same or different global navigation satellite systems) may be selected for reception and use in performing a location determination during the upcoming operating event. The one or more SVs may be the SVs determined to be the least affected SVs based on the ordered list determined at block 540. Therefore, the one or more SVs selected at block may be SVs already being used for location determination by the GNSS receiver or may include one or more SVs that are not currently being used for location determination. In addition to selecting one or more SVs based on expected performance during the upcoming operating event based on the ordered list, geometric dilution of precision (GDOP) may be taken into account as part of the selection process. GDOP may be especially important when SVs from different global navigation satellite systems are being selected. If multiple of the SVs used for location determination are in a similar part of the "sky" relative to the GNSS receiver, the accuracy of the location determination may be negatively impacted. Rather, a distribution of SVs across the sky may be desirable for improved location determination. Therefore, using the general known location of SVs, a GDOP value may be computed (even if the precise locations of the SVs are unknown). In some embodiments, the lower a GDOP value, the less error that will be attributed to geometric dilution. In some embodiments, the value of GDOP that will result from using a SV may be factored into the selection at block 550. In other embodiments, when possible (e.g., other SVs are available), the calculated GDOP may be kept below a predefined, reference GDOP value. In such environments, where more than one SV is available, a SV may be disqualified from use if it will result in a calculated GDOP value below the reference GDOP value.

At block 560, a GNSS signal may be received from the one or more SVs selected at block 550. The GNSS signal received at block 560 may be received while the operating event is occurring at the RAT transceiver. For example, the RAT transceiver may be transmitting data (and, possibly, creating some amount of interference). The GNSS signal received at block 560 may be used in the performance of a location determination at block 570. Therefore, the location determination performed at block 570 occurs based on the GNSS signal received from the selected SV while the RAT transceiver operating event is occurring. The occurrence of the RAT operating event, thus, does not prevent the GNSS receiver from performing a location determination (or at least reception of the GNSS signal) at the same time. To perform the location determination at block 570, it may be required to GNSS signals to be received from at least three or four SVs. In some embodiments, a determination may be made as to the minimum number of SVs from which GNSS signals need to be received in order to determine a location of the GNSS receiver.

At block 560, a noise or interference measurement may be performed on the GNSS signals received from the one or more selected SVs (and, possibly, any other SVs from which GNSS signals are being received). These measurements may be used to update the data structure as described in relation to block 510.

After the RAT transceiver event has concluded, an SV from which GNSS signals are received and used for location determination by the GNSS receiver may revert to the SV used prior to method 500 being performed. Alternately, the SVs from which GNSS signals are used for location determination may be maintained following the operating event of the RAT transceiver concluding.

Figure 6:
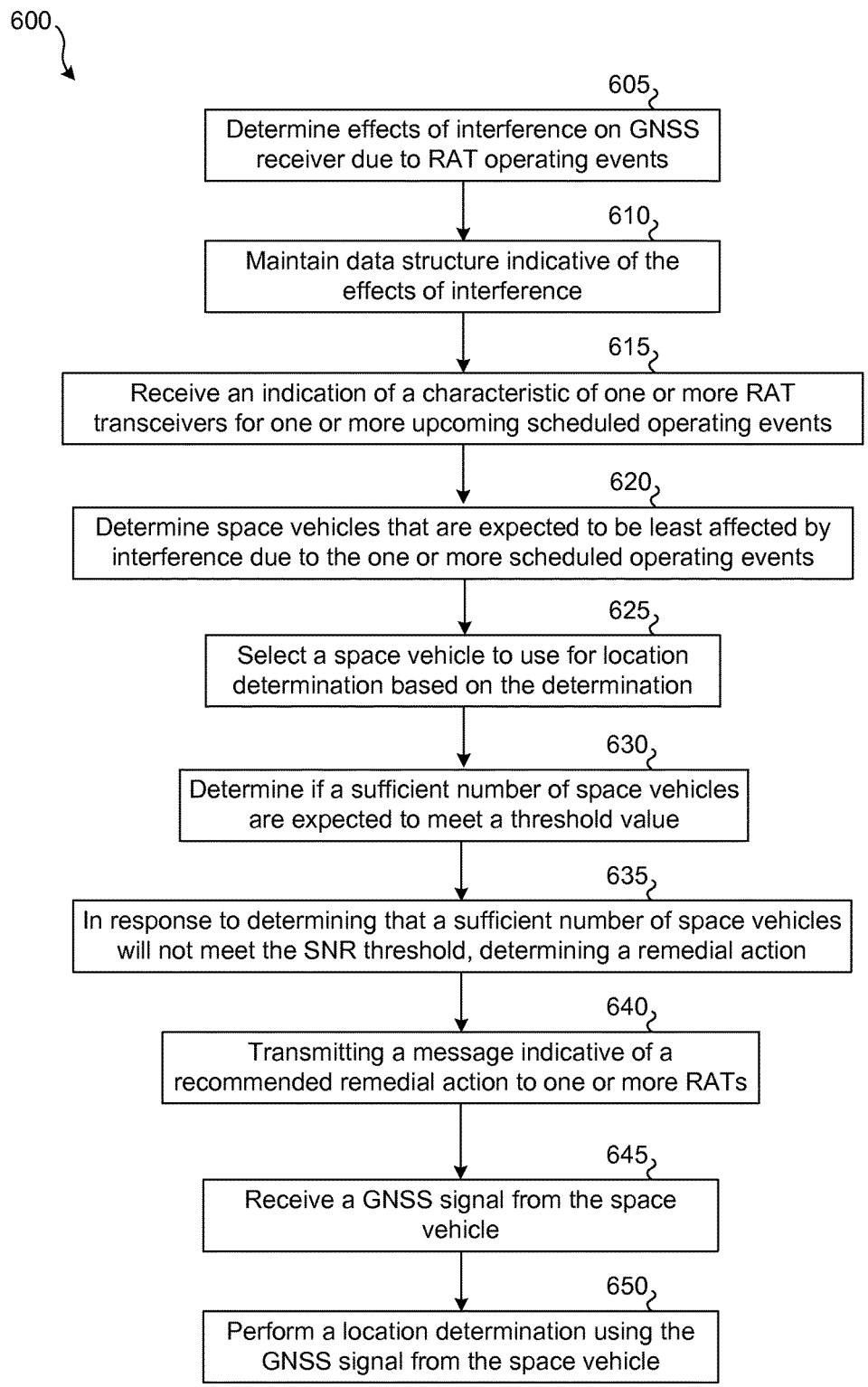
FIG. 6 illustrates an embodiment of a method for managing the coexistence of a GNSS receiver with one or more RAT transceivers by altering operation of a RAT transceiver.

FIG. 6 illustrates an embodiment of a method 600 for managing the coexistence of a GNSS receiver with one or more RAT transceivers by altering operation of a RAT transceiver. Blocks of method 600 may be performed by a CxM, which may be part of a GNSS receiver (e.g., system 200 of FIG. 2) or may be separate from a GNSS receiver (e.g., system 300 of FIG. 3). If separate from a GNSS receiver, a CxM may be a stand-alone component or may be integrated as part of a processor. One or more blocks of method 600 may also be performed by a GNSS receiver. Accordingly, means for performing blocks of method 600 can include a CxM implemented on a GNSS receiver, a GNSS receiver, a communication interface, and/or one or more separate processors. Method 600 may represent a more detailed embodiment of method 400 of FIG. 4 or method 500 of FIG. 5.

At block 605, effects of interference on a GNSS receiver receiving (and processing) GNSS signals may be determined. Such effects may be measured based on the SNR (signal-to-noise ratio), RSSI (received signal strength indication), SNR (signal to interference plus noise ratio), or some other form of measurement. Such measurements may be made by the GNSS receiver, such as by a controller of the GNSS receiver, based on received GNSS signals. Operating events of one or more RAT transceivers may occur at or near the same time. As such, it can be determined the amount of interference or noise present at the GNSS receiver due to various characteristics of various operating events of one or more RAT transceivers. If the CxM is separate from the GNSS receiver, the SNR, RSSI, measured noise, and/or interference value may be transmitted via a communication interface to the CxM. Based upon the measured effects of interference, an SV interference data structure may be maintained at block 610. The data structure may be maintained by a CxM, which can be located onboard a GNSS receiver or may be external to the GNSS receiver and in communication with the GNSS receiver. The SV interference data structure may maintain information about the amount of interference present at the GNSS receiver for receiving GNSS signals while various RAT transceiver operating events are occurring. Separate noise or interference values may be maintained for different RAT transceivers. Separate noise or interference values may be maintained for different combinations of RAT transceivers that have concurrently occurring operating events. Separate noise or interference values may also be maintained based on the frequency and/or transmit power level of the RAT transceivers. Separate noise or interference values may be stored in relation to different global navigation satellite systems and/or specific SVs. As interference or noise values are measured at block 605 in relation to received GNSS signals, these values may be used to update the data structure of block 610.

At block 615, one or more indications of one or more characteristics of an RAT transceiver for a scheduled operating event may be received. The indications of characteristics may be received by a CxM, which is either onboard a GNSS receiver (e.g., as in FIG. 2) or separate (e.g., as in FIG. 3). The characteristics of the RAT transceiver may be indicative of: the type of RAT transceiver, a time and/or duration of an operating event, a type of operating event (e.g., transmit event, receive event), a frequency on which the operating event will occur, a power level at which the operating event will occur, and/or some data that may indicative of interference that will be created. The operating event may be scheduled to occur at some time into the future. For instance, reception of the characteristic by the CxM at block 615 may not be indicative that the event has begun. Rather, based on a time indicated by the characteristics or an expected time (e.g., based on when and/or from which RAT transceiver the indication of the characteristic is received) the operating event time can be determined. While at least one indication of a characteristic may be received, indications of multiple characteristics may be received. For instance, a time, frequency, and power level of a future transmit event for a particular RAT transceiver may be received. In some embodiments, one or more characteristics may be received from a single RAT transceiver. In other embodiments, multiple characteristics from multiple RAT transceivers may be received. It should be understood that multiple RAT transceivers having operating events that overlap in time may produce different interference characteristics than either of the same RAT transceiver having operating events occur individually, such as due to intermodulation of the interference signals.

At block 620, space vehicles that are expected to be the least affected by the conditions during the upcoming RAT operating event may be determined. The SVs may be selected based on the one or more characteristics received at block 615 and an analysis of the data structure maintained at block 610. Therefore, based on the one or more characteristics that define an upcoming scheduled operating event of the RAT transceiver, an ordering of SVs may be determined. The ordering of SVs may be from least affected to most affected. The SVs ordered may be for a specific GNSS being used by the GNSS receiver. Alternatively, SVs from multiple global navigation satellite systems may be ordered together (e.g., an SV of GPS may be ordered with SVs of GLONASS and Galileo). An ordering of least-affected SVs may be created by the CxM. The least-affected SVs may be based on the current SNR of the SV assessed in conjunction with the expected noise or interference as indicated in the data structure or may be solely based on the appropriate values indicated in the SV interference data structure. In some embodiments, the data structure may indicate an expected SNR if GNSS signals from the SV are used during the RAT transceiver operating event. Accordingly, following block 620, an order of SVs that are expected to be the least affected by the one or more characteristics received at block 615 may be determined using the data structure maintained at block 610.

At block 625, one or more SVs (of a same or different global navigation satellite systems) may be selected for use in performing a location determination. The one or more SVs may be the SVs determined to be the least affected SVs based on the ordering determined at block 620. Therefore, the one or more SVs selected at block 625 may be SVs already being used for location determination by the GNSS receiver or may include one or more SVs that are not currently being used for location determination. In some embodiments, once a SV has been selected to be used, the same SV may be required to be used for at least a minimum dwell time, such as 50 or 100 ms, before switching to another SV.

At block 630, it may be determined whether, based on the expected interference during the upcoming one or more RAT transceiver operating events, GNSS signals will be properly received from a sufficient number of SVs. Therefore, an analysis may be performed to determine if sufficiently strong GNSS signals will be received from the least affected SVs identified at block 620. A noise threshold value (e.g., an SNR value, RSSI value, SNR value, or some other form of value) may be compared with expected values of GNSS signals for each of the SVs selected to be used. If the GNSS signals are expected to be sufficiently strong based on the comparison (e.g., sufficient GNSS signals are expected to be received from at least 3 or 4 of the least affected SVs), method 600 may proceed similarly to method 500 from block 560 on. If, at block 630, the CxM determines that the GNSS signals are expected to be weak during the one or more RAT transceiver operating events based on the comparison (e.g., insufficient GNSS signals are expected to be received from at least 3 or 4 of the least affected SVs), method 600 may proceed to block 635 such that one or more remedial actions can be taken by the CxM.

At block 635, in response to determining that GNSS signals will not sufficiently be received and processed from a sufficient number of SVs by the GNSS receiver (even despite GNSS signals from the least affected SVs being used for location determination), a remedial action may be determined by the CxM. Based upon by how much the GNSS signals miss the threshold, the remedial action may vary. Different remedial actions may be determined for different RAT transceivers. Remedial actions may include instructing a RAT transceiver to: decrease a power level of an operating event, alter a frequency of an operating event, delay performance of the operating event, and/or cancel the operating event. For instance, if the GNSS receiver is barely receiving sufficient GNSS signals (e.g., receiving an RSSI of GNSS signals just above the threshold for a low number of SVs), the recommendation may be to halt all operating events by RAT transceivers. In some embodiments, the one or more transceivers may be obligated to abide by a recommendation made by the CxM regarding such remedial actions. In other embodiments, the recommendation may be optional, with the RAT transceiver being permitted to ignore or alter the command based on its own determined operating conditions.

At block 640, a message indicative of the remedial action may be transmitted by the CxM to the one or more relevant RAT transceivers. The CxM may assess, such as based on input from another component, a HLOS, or application, whether preference should be given to the GNSS receiver (by making the command required) or the RAT transceiver (by making the recommendation optional, or by not transmitting the command at all). The CxM, if the message is to be transmitted, may transmit the recommendation to the relevant one or more RAT transceivers. Enforcement or execution of the message may be left to the relevant RAT transceiver.

At block 645, a GNSS signal may be received from the one or more SVs selected at block 625. The GNSS signal received at block 645 may be received while the operating event is occurring at the RAT transceiver. The remedial action recommended by the CxM may have been performed by the RAT transceiver thus resulting in at least a lessened amount of interference being generated by the RAT transceiver. For example, the RAT transceiver may be transmitting data (and, possibly, creating some amount of interference), but at a different power level and/or a different frequency than originally intended by the RAT transceiver or the operating event may have been cancelled or delayed. The GNSS signal received at block 645 may be used in the performance of a location determination at block 650. Therefore, the location determination performed at block 650 occurs based on the GNSS signal received from the selected SV while the RAT transceiver operating event is occurring. Therefore, the occurrence of the RAT operating event did not prevent the GNSS receiver from performing a location determination at the same time. To perform the location determination at block 650, it may be required to GNSS signals to be received from at least three or four SVs. In some embodiments, a determination may be made as to the minimum number of SVs from which GNSS signals need to be received in order to determine a location of the GNSS receiver.

At block 650, a noise or interference measurement may be performed on the GNSS signals received from the one or more selected SVs (and, possibly, any other SVs from which GNSS signals are being received). These measurements may be used to update the data structure as described in relation to block 610.

After the RAT transceiver event has concluded, an SV from which GNSS signals are received and used for location determination by the GNSS receiver may revert to the SV used prior to blocks of method 600 being performed. Alternately, the SVs from which GNSS signals are used for location determination may be maintained, following the operating event of the RAT transceiver concluding. The one or more RAT transceivers may continue to abide by a recommendation made by the CxM or may return to performing operating events as determined by the RAT transceiver without recommendations (either optional or required) from the CxM.

Figure 7:
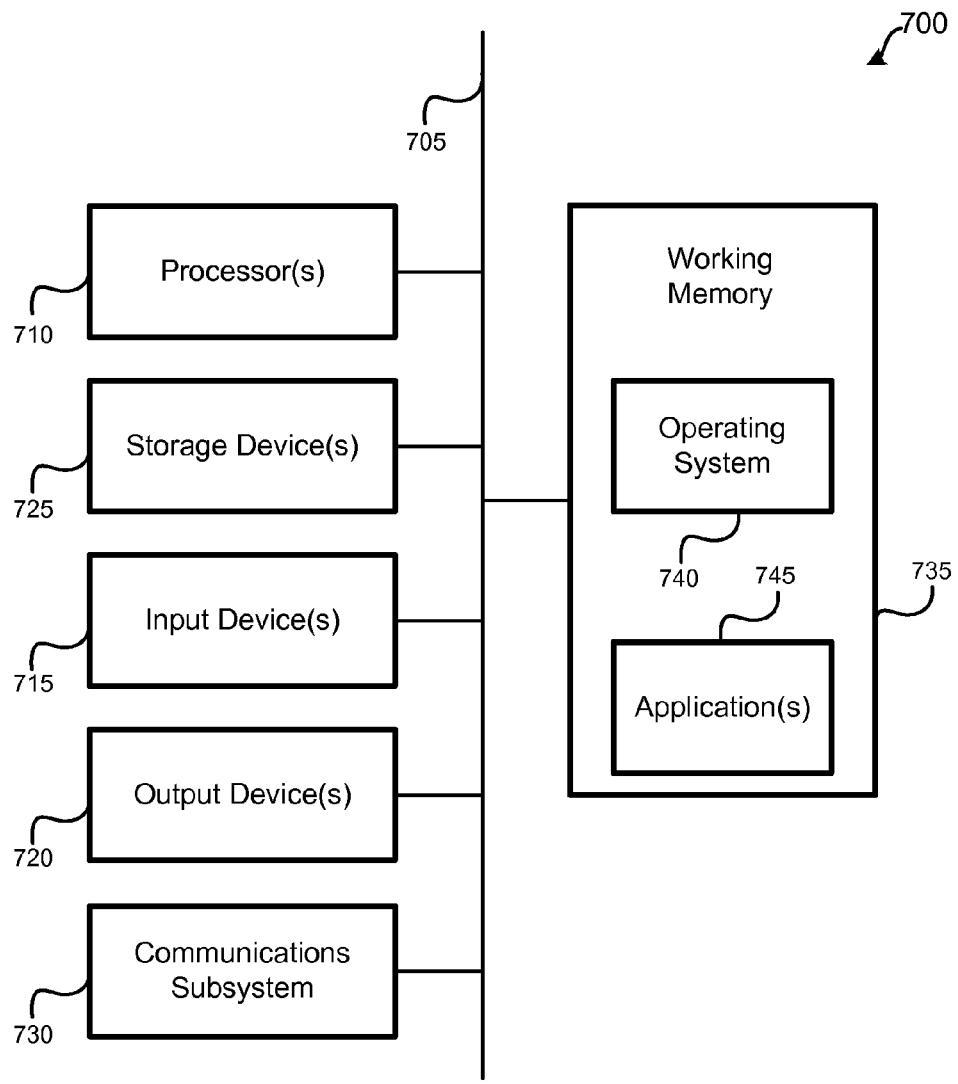
FIG. 7 illustrates an embodiment of a computer system.

A computer system as illustrated in FIG. 7 may be incorporated as part of the previously described computerized devices, such as systems 100, 200, and 300. For instance, functions of a CxM may be performed by a general-purpose processor implemented as part of computer system 700. Further, systems 100, 200, and 300 may reside on a computerized mobile device, such as a tablet computer or cellular phone that contains computer system 700. FIG. 7 provides a schematic illustration of one embodiment of a computer system 700 that can perform various blocks of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for managing coexistence of a global navigation satellite system (GNSS) receiver with a radio access technology (RAT) transceiver, the method comprising:
   receiving, by a coexistence manager, from the RAT transceiver, an indication of a characteristic of the RAT transceiver for a scheduled operating event;
   determining, by the coexistence manager, that signals from a sufficient number of space vehicles will not be acquired based on the characteristic of the RAT transceiver received by the coexistence manager;
   transmitting, by the coexistence manager, a message to the RAT transceiver that recommends limiting a transmit power level for the scheduled operating event such that signals from the sufficient number of space vehicles will be acquired during the operating event of the RAT transceiver;
   selecting, by the coexistence manager, a space vehicle of a GNSS to use for a location determination by the GNSS receiver based on the characteristic of the RAT transceiver;
   receiving, by the GNSS receiver, a signal from the space vehicle of the GNSS during the operating event of the RAT transceiver; and
   performing, by the GNSS receiver, the location determination using the signal received from the space vehicle of the GNSS received during the operating event of the RAT transceiver.

2. The method for managing coexistence of the GNSS receiver with the RAT transceiver of claim 1, wherein selecting, by the coexistence manager, the space vehicle of the GNSS to use for a location determination by the GNSS receiver comprises:
   determining, by the coexistence manager, an ordering of a plurality of space vehicles based on the characteristic of the RAT transceiver for the scheduled operating event; and
   selecting, by the coexistence manager, the space vehicle of the GNSS based on the ordering of the plurality of space vehicles.

3. The method for managing coexistence of the GNSS receiver with the RAT transceiver of claim 1, further comprising:
   calculating, by the coexistence manager, an order of a plurality of space vehicles, wherein the order is based on a magnitude of effect of the characteristic of the RAT transceiver for the operating event on the location determination of the GNSS receiver, wherein
   selecting the space vehicle of the GNSS to use for a location determination of the GNSS receiver is based on the order.

4. The method for managing coexistence of the GNSS receiver with the RAT transceiver of claim 1, further comprising:
   determining, by the coexistence manager, a time at which to schedule the operating event of the RAT transceiver to occur; and
   transmitting, by the coexistence manager, to the RAT transceiver, a message that recommends the time for the operating event.

5. The method for managing coexistence of the GNSS receiver with the RAT transceiver of claim 1, further comprising:
   determining, by the coexistence manager, a frequency at which the operating event of the RAT transceiver is to occur; and
   transmitting, by the coexistence manager, to the RAT transceiver, a message that recommends the frequency to use for the operating event.

6. The method for managing coexistence of the GNSS receiver with the RAT transceiver of claim 1, further comprising determining, by the coexistence manager, a power level for the operating event; wherein the message further recommends the power level for the operating event.

7. The method for managing coexistence of the GNSS receiver with the RAT transceiver of claim 1, further comprising:
   selecting, by the coexistence manager, the GNSS from a plurality of global navigation satellite systems available for location determination based on the characteristic of the RAT transceiver.

8. The method for managing coexistence of the GNSS receiver with the RAT transceiver of claim 1, wherein selection of the space vehicle of the GNSS to use for the location determination of the GNSS receiver occurs within a preselected GNSS.

9. The method for managing coexistence of the GNSS receiver with the RAT transceiver of claim 1, wherein the characteristic of the RAT transceiver is selected from the group consisting of:
 a planned time window;
 a polarization;
 a planned frequency; and
 a planned power level.

10. The method for managing coexistence of the GNSS receiver with the RAT transceiver of claim 1, wherein the coexistence manager is integrated with the GNSS receiver.

11. A system for managing coexistence of a global navigation satellite system (GNSS) receiver with a radio access technology (RAT) transceiver, the system comprising:
 a coexistence manager configured to:
  receive, from the RAT transceiver, an indication of a characteristic of the RAT transceiver for a scheduled operating event;
  determine that signals from a sufficient number of space vehicles will not be acquired based on the characteristic of the RAT transceiver received by the coexistence manager;
  transmit a message to the RAT transceiver that recommends limiting a transmit power level for the scheduled operating event such that signals from the sufficient number of space vehicles will be acquired during the operating event of the RAT transceiver; and
  select, a space vehicle of a GNSS to use for a location determination by the GNSS receiver based on the characteristic of the RAT transceiver; and
 the GNSS receiver, configured to:
  receive a signal from the space vehicle of the GNSS during the operating event of the RAT transceiver; and
  perform the location determination using the signal received from the space vehicle of the GNSS received during the operating event of the RAT transceiver for the operating event.

12. The system for managing coexistence of the GNSS receiver with the RAT transceiver of claim 11, wherein the coexistence manager being configured to select the space vehicle of the GNSS to use for a location determination by the GNSS receiver comprises the coexistence manager being configured to:
 determine an ordering of a plurality of space vehicles based on the characteristic of the RAT transceiver for the scheduled operating event; and
 select the space vehicle of the GNSS based on the ordering of the plurality of space vehicles.

13. The system for managing coexistence of the GNSS receiver with the RAT transceiver of claim 11, the coexistence manager being further configured to:
 calculate an order of a plurality of space vehicles, wherein the order is based on a magnitude of effect of the characteristic of the RAT transceiver for the operating event on the location determination of the GNSS receiver, wherein
 selection of the space vehicle of the GNSS to use for a location determination of the GNSS receiver is based on the order.

14. The system for managing coexistence of the GNSS receiver with the RAT transceiver of claim 11, the coexistence manager being further configured to:
 determine a time at which to schedule the operating event of the RAT transceiver to occur; and
 transmit to the RAT transceiver, a message that recommends the time for the operating event.

15. The system for managing coexistence of the GNSS receiver with the RAT transceiver of claim 11, the coexistence manager being further configured to:
 determine a frequency at which the operating event of the RAT transceiver is to occur; and
 transmit, to the RAT transceiver, a message that recommends the frequency to use for the operating event.

16. The system for managing coexistence of the GNSS receiver with the RAT transceiver of claim 11, the coexistence manager being further configured to include, in the message a recommendation of the power level for the operating event.

17. The system for managing coexistence of the GNSS receiver with the RAT transceiver of claim 11, the coexistence manager being further configured to:
 select the GNSS from a plurality of global navigation satellite systems available for location determination based on the characteristic of the RAT transceiver.

18. The system for managing coexistence of the GNSS receiver with the RAT transceiver of claim 11, wherein the coexistence manager is configured to select the space vehicle of the GNSS to use for the location determination of the GNSS receiver occurs within a preselected GNSS.

19. The system for managing coexistence of the GNSS receiver with the RAT transceiver of claim 11, wherein the coexistence manager is integrated with the GNSS receiver.

20. The system for managing coexistence of the GNSS receiver with the RAT transceiver of claim 11, wherein the coexistence manager is implemented in a processor separate from the GNSS receiver.

21. An apparatus for managing coexistence of a global navigation satellite system (GNSS) receiver with a radio access technology (RAT) transceiver, the apparatus comprising:
 managing means for:
  receiving, from the RAT transceiver, an indication of a characteristic of the RAT transceiver for a scheduled operating event;
  determining signals from a sufficient number of space vehicles will not be acquired based on the characteristic of the RAT transceiver received by the coexistence manager;
  transmitting a message to the RAT transceiver that recommends limiting a transmit power level for the scheduled operating event such that signals from a sufficient number of space vehicles will be acquired during the operating event of the RAT transceiver;
  selecting a space vehicle of a GNSS to use for a location determination by the GNSS receiver based on the characteristic of the RAT transceiver for the operating event;
 receiving means for:
  receiving a signal from the space vehicle of the GNSS during the operating event of the RAT transceiver; and
  performing the location determination using the signal received from the space vehicle of the GNSS received during the operating event of the RAT transceiver.

22. The apparatus for managing coexistence of the GNSS receiver with the RAT transceiver of claim 21, wherein the managing means for selecting the space vehicle of the GNSS to use for a location determination by the GNSS receiver is configured to:

determine an ordering of a plurality of space vehicles based on the characteristic of the RAT transceiver for the scheduled operating event; and select the space vehicle of the GNSS based on the ordering of the plurality of space vehicles.

23. The apparatus for managing coexistence of the GNSS receiver with the RAT transceiver of claim 21, wherein the managing means is further configured to:

calculate an order of a plurality of space vehicles, wherein the order is based on a magnitude of effect of the characteristic of the RAT transceiver for the operating event on the location determination of the GNSS receiver, wherein select the space vehicle of the GNSS to use for a location determination of the GNSS receiver is based on the order.

24. The apparatus for managing coexistence of the GNSS receiver with the RAT transceiver of claim 21, wherein the managing means is further configured to:

determine a time at which to schedule the operating event of the RAT transceiver to occur; and transmit to the RAT transceiver, a message that recommends the time for the operating event.

25. A non-transitory processor-readable medium for managing coexistence of a global navigation satellite system (GNSS) receiver with a radio access technology (RAT) transceiver, comprising processor-readable instructions configured to cause one or more processors to:

receive, from the RAT transceiver, an indication of a characteristic of the RAT transceiver for a scheduled operating event;

determine signals from a sufficient number of space vehicles will not be acquired based on the characteristic of the RAT transceiver received by the coexistence manager;

transmit a message to the RAT transceiver that recommends limiting a transmit power level for the scheduled operating event such that signals from a sufficient number of space vehicles will be acquired during the operating event of the RAT transceiver;

select, a space vehicle of a GNSS to use for a location determination by the GNSS receiver based on the characteristic of the RAT transceiver for the operating event;

receive, a signal from the space vehicle of the GNSS during the operating event of the RAT transceiver; and perform, the location determination using the signal received from the space vehicle of the GNSS received during the operating event of the RAT transceiver.

26. The non-transitory processor-readable medium for managing coexistence of the GNSS receiver with the RAT transceiver of claim 25, wherein the processor-readable instructions that, when executed, cause the one or more processors to select the space vehicle of the GNSS to use for a location determination by the GNSS receiver comprise processor-readable instructions which, when executed, cause the one or more processors to:

determine an ordering of a plurality of space vehicles based on the characteristic of the RAT transceiver for the scheduled operating event; and select the space vehicle of the GNSS based on the ordering of the plurality of space vehicles.

* * * * *